United States Patent [19]

Dvorkis

[11] Patent Number: 5,412,198

[45] Date of Patent: May 2, 1995

[54] HIGH-SPEED SCANNING ARRANGEMENT WITH HIGH-FREQUENCY, LOW-STRESS SCAN ELEMENT

[75] Inventor: Paul Dvorkis, Stony Brook, N.Y.

[73] Assignee: Symbol Technologies, Inc., Bohemia, N.Y.

[21] Appl. No.: 789,705

[22] Filed: Nov. 8, 1991

Related U.S. Application Data

[63] Continuation-in-part of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.⁶ ............................................. G06K 7/10
[52] U.S. Cl. ................................... 235/472; 235/462; 235/467; 235/470; 359/224; 359/226
[58] Field of Search ............... 235/472, 462, 467, 470; 359/198, 199, 200, 212, 223, 224, 225, 226

[56] References Cited

U.S. PATENT DOCUMENTS

| | | | |
|---|---|---|---|
| 1,202,446 | 10/1916 | Speed | 310/38 |
| 1,552,186 | 9/1925 | Anderson | 73/653 |
| 1,800,601 | 4/1931 | Centeno | 358/208 |
| 1,873,926 | 8/1932 | Centeno | 358/208 |
| 2,971,054 | 2/1961 | Holt, Jr. | 358/232 |
| 2,989,643 | 6/1961 | Scanlon | 358/206 |
| 3,087,373 | 4/1963 | Poor et al. | 250/230 |
| 3,532,408 | 10/1970 | Dostal | 359/199 |
| 3,642,343 | 2/1972 | Tchejeyan et al. | 350/6 |
| 3,981,556 | 9/1976 | Sabatelli et al. | 339/275 T |
| 3,981,566 | 9/1976 | Frank et al. | 359/224 |
| 3,998,092 | 12/1976 | Maccabee | 359/224 |
| 4,021,096 | 5/1977 | Dragt | 350/6 |
| 4,175,832 | 11/1979 | Umeki et al. | 350/285 |
| 4,199,219 | 4/1980 | Suzuki et al. | 358/75 |
| 4,251,798 | 2/1981 | Swartz et al. | 235/462 |
| 4,256,364 | 3/1981 | Minoura et al. | 350/6.9 |
| 4,369,361 | 1/1983 | Swartz et al. | 235/470 |
| 4,387,297 | 6/1983 | Swartz et al. | 235/470 |
| 4,409,470 | 10/1983 | Shepard et al. | 235/472 |
| 4,496,831 | 1/1985 | Swartz et al. | 235/467 |
| 4,593,186 | 6/1986 | Swartz et al. | 235/472 |
| 4,632,501 | 12/1986 | Glynn | 350/6.6 |
| 4,691,212 | 9/1987 | Solcz et al. | 346/108 |
| 4,705,365 | 11/1987 | Wakita et al. | 350/487 |
| 4,732,440 | 3/1988 | Gadhok | 350/6.6 |
| 4,808,804 | 2/1989 | Krichever et al. | 235/472 |
| 4,816,660 | 3/1989 | Swartz et al. | 235/462 |
| 4,816,661 | 3/1989 | Krichever et al. | 235/472 |
| 4,871,904 | 10/1989 | Metlitsky et al. | 235/470 |
| 4,902,083 | 2/1990 | Wells | 350/6.6 |
| 4,919,500 | 4/1990 | Paulsen | 350/6.6 |
| 4,974,918 | 12/1990 | Delache et al. | 350/6.6 |
| 5,168,149 | 12/1992 | Dvorkis et al. | 235/462 |
| 5,177,631 | 1/1993 | Orlicki et al. | 359/214 |

FOREIGN PATENT DOCUMENTS 0344882  2/1989  European Pat. Off. .
0471291A2  7/1991  European Pat. Off. .

OTHER PUBLICATIONS

Reich, "The Use of Electro-Mechanical Mirror Scanning Devices," SPIE vol. 84 Laser Scanning Components & Techniques, pp. 47-55 (1976).

Primary Examiner—William L. Sikes
Assistant Examiner—Tai V. Duong

[57] ABSTRACT

A scanning arrangement in a scanner which is operative for repetitively scanning indicia having parts of different light reflectivity; for example, such as bar code symbol, and also pertains to the operation of a scanning arrangement of that type at high scanning speeds in two-dimensional or multi-axes scan patterns. A resonance asymmetric scan element (RASE) in which a scan element, which is preferably constituted of a mirror, is in effect attached along the upper side edges thereof to oscillation-imparting spring-means and not at the center of mass of the mirror as heretofore. This allows for higher frequencies of operation for the scan element at lower encountered stresses in that the fast axis of rotation of the scan element or mirror; in essence, the axis of oscillatory rotation about which the mirror is rotated at high frequencies substantially coincides with its center of mass.

63 Claims, 8 Drawing Sheets

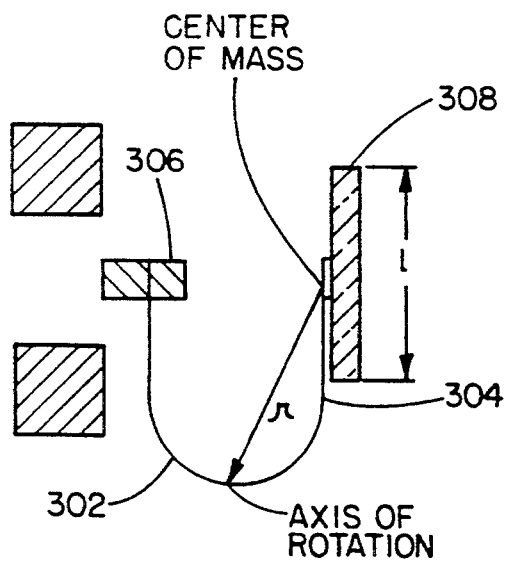
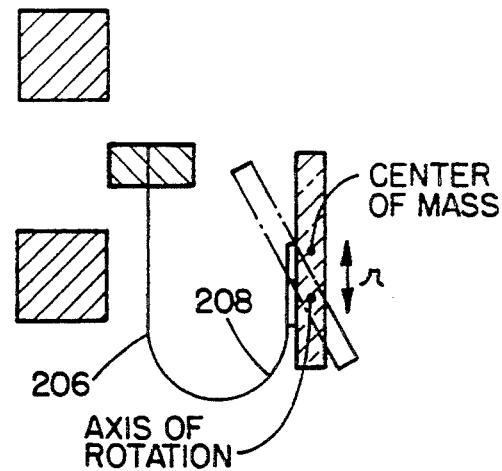
FIG. 3 (PRIOR ART)
FIG. 4 (PRIOR ART)
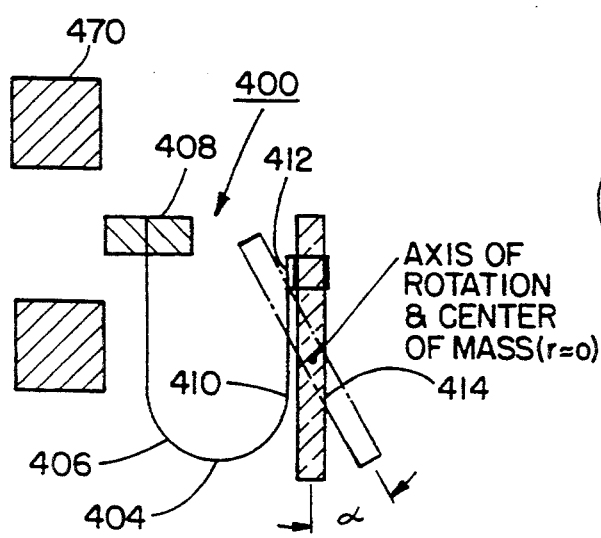
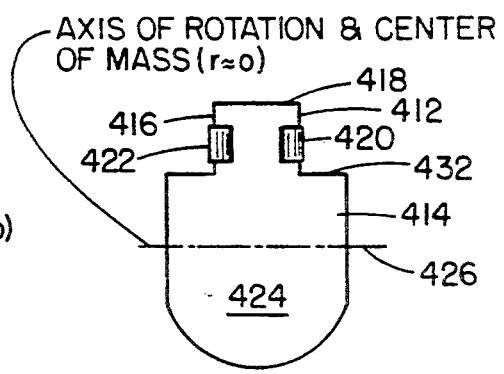
FIG. 5a
FIG. 5b

HIGH-SPEED SCANNING ARRANGEMENT WITH HIGH-FREQUENCY, LOW-STRESS SCAN ELEMENT

CROSS-REFERENCE TO RELATED APPLICATIONS

This application is a continuation-in-part of Ser. No. 520,464, filed May 8, 1990, now U.S. Pat. No. 5,168,149, which is a continuation-in-part of Ser. No. 428,770, filed Oct. 30, 1989, now U.S. Pat. No. 5,099,110.

BACKGROUND OF THE INVENTION

1. Field of the Invention

The present invention relates, in general, to a scanning arrangement in a scanner which is operative for repetitively scanning indicia having parts of different light reflectivity; for example, such as bar code symbol, and more particularly pertains to the operation of a scanning arrangement of that type at high scanning speeds in two-dimensional or multi-axes scan patterns.

Moreover, the invention is specifically directed to the provision of a fast two-dimensional scanning scan element adapted to operate at higher frequencies and which is subjected to lower stresses during respective scanning of indicia on a target object, in comparison with scanning arrangements of this type which are currently employed in the technology, thereby maximizing the efficiency of the scan element by enabling operation thereof at larger amplitudes and increased dimensions for the scan element or mirror.

The utilization of laser scanning devices for the scanning or reading of information provided on a target; such as a package or sale item, is well known in this particular technology and has found wide acceptance in commerce. In this connection, various types of laser scanning devices incorporate scanning heads which house optical reading systems, such as bar code readers, for the reading of information or bar code symbols on targets which are scanned by a laser beam projected from the bar code reader. In general, such laser scanning devices; especially those in the type of bar code readers, are widely employed in industry, such as manufacturing, shipping, and in retail commerce and; for example, may be permanently incorporated in the structures of check-out counters of supermarkets, whereby the items of merchandise having the bar code symbols imprinted thereon or applied thereto are passed over a fixed bar code reader located beneath the counter surface so as to provide a record for the merchant of the merchandise being purchased by a consumer, and concurrently a readout (and possibly a printed record) for the consumer.

Alternatively, the bar code reader or laser scanning device may also be constituted of an optical scanner unit which is fixedly mounted on a stand extending above a support platform or countertop on which the merchandise may be arranged; or in many instances of utilization, pursuant to a preferred embodiment of the invention, may be in the form of a miniature, lightweight and gun-shaped device having a pistol grip, and which the actived device is normally passed over the bar code symbol which is imprinted on a sale item or target at some short distance therefrom so as to enable scanning of the information provided by the bar code symbols.

2. Discussion of the Prior Art

Various optical readers and optical scanning systems have been developed heretofore for reading bar code symbols appearing on a label or on the surface of an article. The bar code symbol itself is a coded pattern of indicia comprises of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications, in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, the light beam or laser beam projected therefrom, at a target and a symbol which is to be read.

The light source in a laser scanner is typically a gas laser or semiconductor laser. The use of semiconductor devices, such as a laser diode, as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For purpose of discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored On a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may incorporate a drive or scanning motor adopted to either sweep the beam spot across the symbol and trace a scan line across and past the symbol in a high-speed repetitive mode, or scan the field of view of the scanner, or do both.

Scanning systems also normally include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates detectors based upon charge coupled device (CCD) technology. In such readers, the size of the detector is larger than or substantially the same as the symbol which is to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

In essence, the invention is directed towards the development of a scanner incorporating a rapidly oscillated scan element or mirror which is uniquely supported and dimensioned so as to be adapted for high frequency scanning operation, for instance, such as for a range of 350 up to 1200 Hz, with large-sized scan element or mirror being subjected to only low stresses. Hereby, the efficiency in the construction and utilization of the scan element is maximized, and it is possible to attain a higher scanning frequency during the operation thereof at a larger sweep or amplitude, with improved mirror dimensions while concurrently reducing any stresses imparted thereto during high frequency operation to the lowest attainable level, thereby also increasing the service life of this element.

In connection with the foregoing, the invention accordingly contemplates the provision of a scanning arrangement which incorporates essentially a resonance asymmetric scan element (RASE) in which the scan element, which is preferably constituted of a mirror, is in effect attached along the upper side edges thereof to oscillation-imparting spring means and not at the center of mass of the mirror as heretofore. This allows for higher frequencies of operation for the scan element at lower encountered stresses in that the fast axis of rotation of the scan element or mirror; in essence, the axis of oscillatory rotation about which the mirror is rotated at high frequencies substantially coincides with its center of mass, thereby dramatically reducing stresses generated by the oscillatory movement to extremely low and tenable levels, permitting scanning operation at high frequencies, improved configurations and sizing for the mirror with attachment thereof to a unique holder construction which will allow for the foregoing operation with all its attendant advantages.

Accordingly, the invention is implemented and constructively realized through the provision of a unique scanning arrangement whereby the scan element, preferably consisting of a mirror, is mounted on vibratory components, such a U-shaped spring of the scanning arrangement having a novel holder gripping engaging the upper side edges of the mirror, the latter of which is configured such that the fast or high frequency axis of rotation for the scan element or mirror on the vibratory component essentially coincides with the center of mass of the mirror. This, in effect, will reduce any vibratory stresses generated in the region of attachment of the mirror to relatively low levels facilitating operation of the device at higher frequencies and with the employment of a larger-sized mirror, thereby considerably improving upon on the quality of the scanning operation while increasing the service life of the components.

Pursuant to another aspect of the invention, the scan element or mirror is attached to the holder mounting the scan element for high-frequency scanning operation such that an upper portion of the mirror, which has the side edges thereof clampingly engaged by the holder, has a narrow width extending downwardly into a relatively large-surfaced mirror dimensioned such that the fast or high-frequency axis of oscillatory rotation of the mirror will substantially coincide with the center of mass thereof. Hereby, the holder may consist of gripping arms or inwardly folded clips extending along the side edges at the upper end of a U-shaped spring mounting the holder, wherein the spring forms a vibratory element having high-frequency vibrations and whereby the upper side edge portion of the uniquely configured scan element or mirror is in flexible gripping arms of the holder such that the high-frequencied of fast axis of oscillatory rotation of the mirror essentially coincides with the center of mass thereof, thereby considerably reducing the level of vibratory stresses in the support structure for the mirror during high frequency operation of the scanning arrangement. For this purpose, the holder and/or spring may be constituted from a suitable beryllium copper alloy possessing high mechanical strength, yet being of light weight and possessing an extensive degree of flexibility.

Accordingly, it is an object of the present invention to provide a scan element, such as a mirror, which is uniquely dimensioned and mounted on a holder of oscillation-imparting component such that the center of mass of the mirror essentially coincides with the fast axis of oscillatory rotation thereof, to resultingly reduce stresses in the support structure thereof.

Another object of the present invention resides in the provision of a scanning arrangement of the type described herein, which includes a resonance asymmetric scan element comprising a scan mirror dimensioned and mounted for oscillation in such a manner that the center of mass thereof essentially coincides with the fast or high-frequency axis of rotation of the scan element.

Yet another object of the present invention relates to a novel method of utilizing the asymmetric resonance scan element pursuant to the invention as described hereinabove so as to substantially reduce vibratory stresses which are generated during high-frequency operation in the course of implementing a fast two-dimensional scanning pattern.

BRIEF DESCRIPTION OF THE DRAWINGS

Reference may now be had to the following detailed description of exemplary embodiments of the invention, taken in conjunction with the accompanying drawings; in which:

FIG. 3 illustrates generally diagrammatically a portion of a scanning arrangement constructed pursuant to the prior art;

FIG. 4 illustrates a further embodiment of a scanning arrangement constructed pursuant to the prior art;

FIGS. 5a and 5b illustrate in respectively cross-sectional and front views, a scanning arrangement pursuant to the invention;

DETAILED DESCRIPTION

Figure 1:
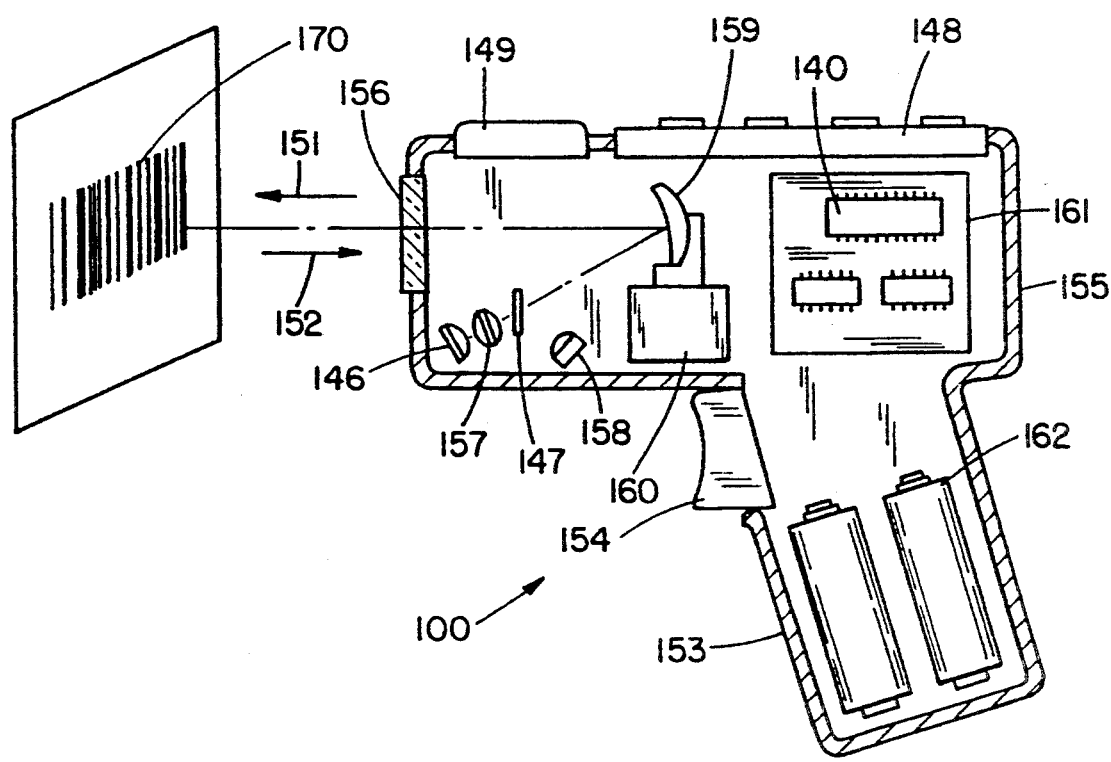
FIG. 1 illustrates a longitudinal sectional view through an exemplary embodiment of a laser scanning device incorporating the inventive resonance asymmetric scan element, wherein the scanning device is in the shape of a hand-held gun-shaped component.

Referring in more specific detail to the drawings, as diagrammatically illustrated in FIG. 1, pursuant to a typical exemplary embodiment, a laser scanning device may be a bar code reader unit 100 in a hand-held gun-shaped configuration, although obviously other kinds of configurations of scanners readily lend themselves to the invention, having a pistol-grip type of handle 153 and in which a movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of from contact with the symbol to distances of perhaps several inches or even further therefrom.

As further depicted in FIG. 1, a suitable lens 157 (or multiple lens system) may be used to focus the scanned beam into the bar code symbol at an appropriate reference plane. A light source 146, such as a semiconductor laser diode, is positioned to introduce a light beam into the axis of the lens 157, and the beam passes through a partially-silvered mirror 147 and other lenses or beam-shaping structure as needed, along with an oscillating mirror or scanning element 159 which is attached to a scanning motor 160 activated when the trigger 154 is pulled. If the light produced by the source 146 is not visible, an aiming light, if needed, produces a visible-light spot which may be fixed, or scanned just like the laser beam; the user employs this visible light to aim the reader unit at the symbol before pulling the trigger 154.

Figure 2:
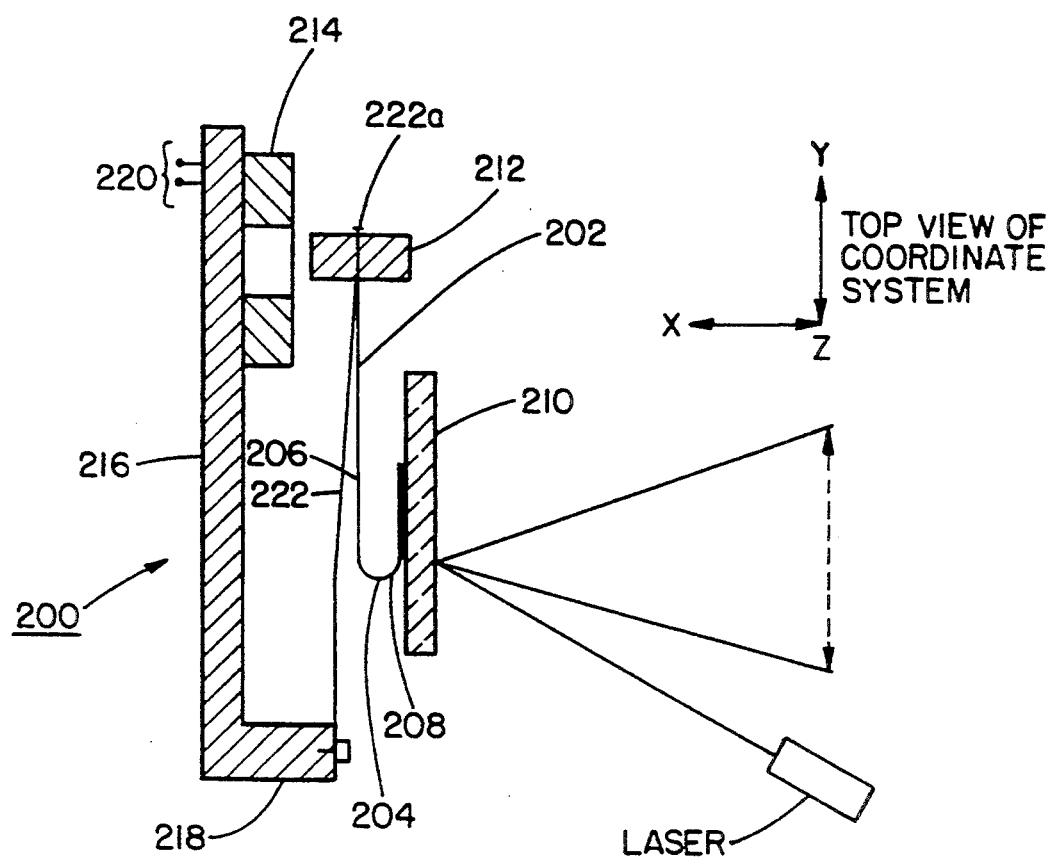
FIG. 2 illustrates a cross-sectional view through a typical scanning arrangement.

As is illustrated in FIG. 2 of the drawings, which represents a typical scanning arrangement 200 for the implementation of a two-dimensional or two-axis scan pattern, a holder 202 incorporates a U-shaped spring 204 having a pair of arms 206 and 208. A scan element 210; for example, such as a light reflector or mirror, is fixedly mounted at the free end of the arm 208, while a permanent magnet 212 is mounted at the opposite free end of arm 206. An electromagnetic coil 214 is fixedly mounted on an upright support member 216, the latter of which is secured to a base 218. Electrical input leads 220 supply an energizing signal to the electromagnetic coil 214. The arm 206 and the permanent magnet 212 are secured to a generally planar spring member 222 at one end 222a thereof, and which has its other end 222b secured to the base 218. The planar spring 222 may be made of any suitable flexible material, such as a leaf spring, a flexible metal foil, a flat bar. The holder comprising the U-shaped spring structure 204, 206, 208 may also be constituted from any suitable metallic material possessing resilient or flexibility properties; preferably a material such as a beryllium-copper alloy. The mass of the mirror 210, which may be equal to the mass of the permanent magnet 212, under certain instances may be much higher than the equivalent mass of the U-shaped spring 204.

Under circumstances, it may be desirable to scan indicia with a raster-type scan pattern, whereby in such a scan pattern, a series of substantially horizontal and substantially parallel scan lines are traversed from an upper horizontal scan line, proceeding downwardly with a multiplicity of intermediate horizontal scan lines to a lower horizontal scan line in order to uniformly cover the desired scan area. In order to obtain a raster-type scan pattern, the U-shaped spring 204 and the planar spring 222 may be arranged to vibrate in planes which are orthogonal to each other. As shown in the drawing, the arms of the U-shaped spring 204 will vibrate in the X-Z plane and the planar spring 222 will vibrate in the X-Y. plane. Through this arrangement of the holder structure 202, the mirror or scanner component 210 is mounted for angular oscillating movement, in first and second alternate circumferential directions, between first and second pairs of scan end positions. Moreover, due to their respective shapes and positioning, the U-shaped spring 204 will vibrate within a high range of frequencies, typically of within 200 to 800 Hz, whereas the planar spring 222 will vibrate within a low range of frequencies, typically about 50 to 200 Hz. The amplitude of vibration necessary to scan the symbol will depend upon the size of the symbol and would typically be at least 10° to 30° optical. In order to increase the angular amplitude by the scan line produced by the holder arrangement 202, which may be desirable for certain applications, such an increase in angular amplitude may be readily attained by constructing the U-shaped spring 204 with the arms being asymmetrically dimensioned, in effect, of different lengths thereby producing a resonant asymmetric scan element. Thus, in a specific embodiment, the arm 208 may be shorter than the arm 206 by a ratio of at least 2:1. Thus, an asymmetrically dimensioned U-shaped spring will result in a longer X direction scan line in a raster-type pattern.

In addition to increasing the angular amplitude, which can be as much as a 100% increase over a symmetrically dimensioned U-shaped spring, an asymmetrically dimensioned U-shaped spring provides a higher durability against metal fatigue and cracking since the nodal point is no longer located at a curved portion of the spring. This type of construction also provides the benefit of less vibration being transferred to the base, since the U-shaped spring is held only at the magnet end and the angular movement of the magnet can be a plurality of times lower than that of the scanning component or mirror 210.

The foregoing, as exemplified in FIGS. 3 and 4 disclosing current technological developments with respect to a scanning arrangement of the type mentioned hereinabove employing either a symmetrical U-shaped spring, as shown in FIG. 3, or an asymmetrically dimensioned U-shaped spring, i.e. with arms of unequal lengths, as shown in FIG. 4, are still subject to various disadvantages which the present invention clearly overcomes.

In the evolution of the inventive scanning arrangement from those in the prior art structures, as shown in FIGS. 3 and 4, into that pursuant to the invention, as shown in FIGS. 5a and 5b, FIG. 3 illustrates the typical tuning fork whereby the U-shaped spring 300 has arm portions 302 and 304 of equal lengths, in which the free end of the arm 302 mounts the permanent magnet 306, whereas the opposite arm 304 has the free end thereof supporting the scanning element or mirror 308 at generally the center of the latter. Consequently, the distance r represents that from the center of mass of the mirror to the fast axis of rotation; in essence, about the high-frequency axis of rotation thereof, with the mirror size, the latter being relatively uniform in surface dimensions being represented by 1. Consequently, the stress which is generated in the flexure, in effect, the U-shaped spring 300 of the scanning device at the locale of the attachment of the scan element or mirror 308, defined by the U-shaped spring 300 is represented by essentially the following equation:

$$S = \frac{6}{wt^2} = \cdot a \cdot (2\pi f)^2 \cdot \frac{M(l^2 + r^2)}{12}$$

wherein:
S = stress in holder (flexure or spring)
w = the width of the flexure and (width of the U-shaped spring 300)
t = the thickness of the flexure (spring 300)
$a$ = angle of maximum deflection (of mirror)
f = frequency of vibration
M = mass of mirror
l = size of mirror (surface area)
r = distance from the center of mass of the mirror to the fast axis of rotation.

From the foregoing, it appears that a factor which considerably controls the stress level in the flexure is primarily represented by the distance r between the center of mass of the mirror or scan element 308 and the fast or high-frequency axis of rotation for the flexure or U-shaped spring 300.

In FIG. 4, which schematically represents the mirror-holding components and asymmetrically U-shaped spring 204 as shown in FIG. 2, the utilization of the asymmetrical U-shaped spring 204, having the arm 208 thereof considerably shorter than the arm 206, the distance r between the center of mass of the mirror and the fast axis of rotation, as is clearly ascertainable, is considerably shorter for this embodiment of a resonance asymmetric scan element in comparison with that in FIG. 3. Consequently, the stress S generated in the flexure or the U-shaped spring 204 is reduced by the function in the differential between "$r^2$", (r to the second power) in essence, by a considerable amount in comparison with that encountered in the embodiment of FIG. 3 illustrating a U-shaped spring having arms of equal lengths.

However, the level of stress s encountered in the flexures or U-shaped springs during scanning operation at the location of attachment of the mirror, as evidenced by the foregoing values of r when computed in the equation as set forth hereinabove may be still further extensively reduced and optimized by mounting the mirror on the holder and also designing the configuration of the former in such a manner as to produce an arrangement in which the center of mass of the mirror and the fast axis of rotation, in effect the high-frequency oscillating axis for the mirror substantially coincide so as to thereby reduce the value of r to essentially zero in the equation. This value of zero for r when introduced into the stress equation for the flexure or spring as set forth hereinabove, provides a significant reduction in the level of stress to which the flexure represented by the U-shaped spring is subjected during the oscillations of the scanning element or mirror.

In accordance with the present invention, this advantage of reducing the stress s to an optimum reduced level may be readily attained with a large-sized scan element or mirror of novel configuration which is clampingly mounted in a suitable holding structure having flexible clip-like gripping arms formed at the end of the shorter arm of the U-shaped spring supporting the scan mirror.

Having specific reference to FIGS. 5a, 5b, 6 and 7, the scanning arrangement 400 pursuant to the invention comprises a resonance asymmetric scan element including a flexure consisting of a planar spring 405 having an upper end attached to the upper end of a U-shaped spring 402 which has a first arm 406 into which there is fastened a magnet 408, whereas a second arm 410 of the U-shaped spring or flexure 404 which is shorter than the arm 406 has its upper or free end provided with a flexible holder structure 412, preferably constituted from a berylliumcooper alloy, as described in more specific detail hereinbelow, for clampingly engaging and mounting a scan element or mirror 414 which is constructed according to the present invention. Hereby, the mirror has a reduced cross-sectional width at the upper end 416 thereof so as to form a generally rectangular neck portion 418, the opposite side edges 418a, 418b of which are clamped by inwardly folded clip-like members or gripping arms 420 and 422 formed at the opposite sides of the holder structure 412 on the upper end of the arm 410. Below the neck portion 418 of the mirror 414, which is mounted on the spring arm 410 by being engaged and between the gripping arms 420, 422, the mirror widens considerably both sideways and downwardly so as to provide a large surface 424 for scanning purposes, through which there extends the fast or high-frequency axis of rotation 426. This mounting of the mirror 414 at its upper neck portion 418 to the flexure or spring 404 essentially positions the center of mass M of the mirror 414 so as to essentially coincide with the fast axis of rotation 426 and thereby reduces the distance r between the mirror center of mass and the axis of rotation to practically zero.

Figure 6:
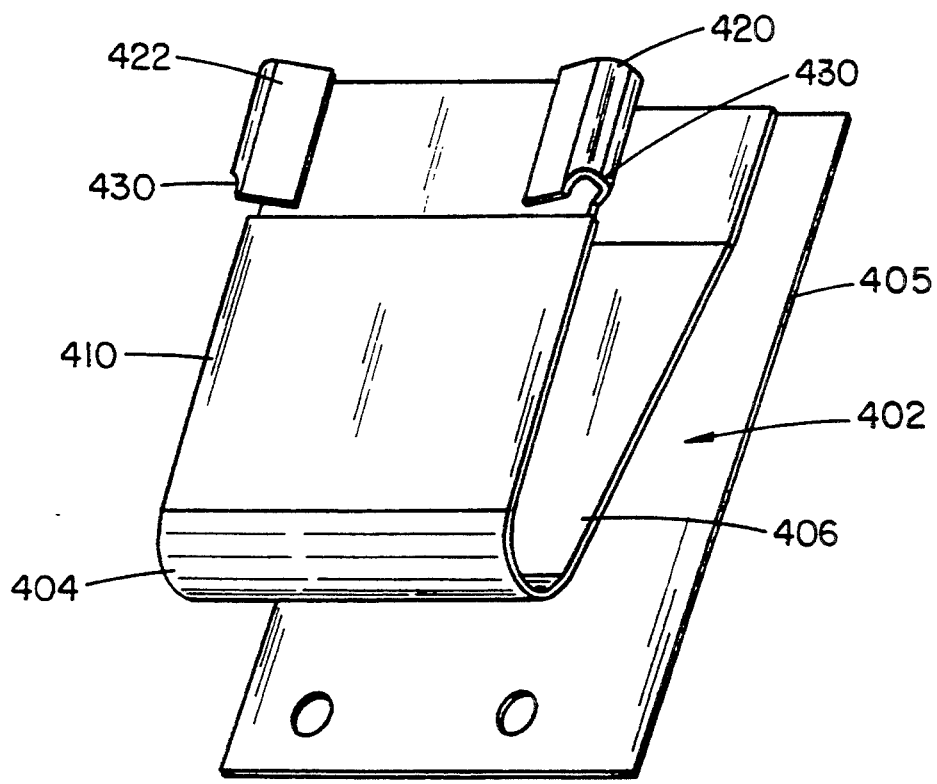
FIG. 6 illustrates, on an enlarged scale, a front perspective view of a holder for mounting the scan element or mirror of the scanning arrangement of FIGS. 5a and 5b.
Figure 7:
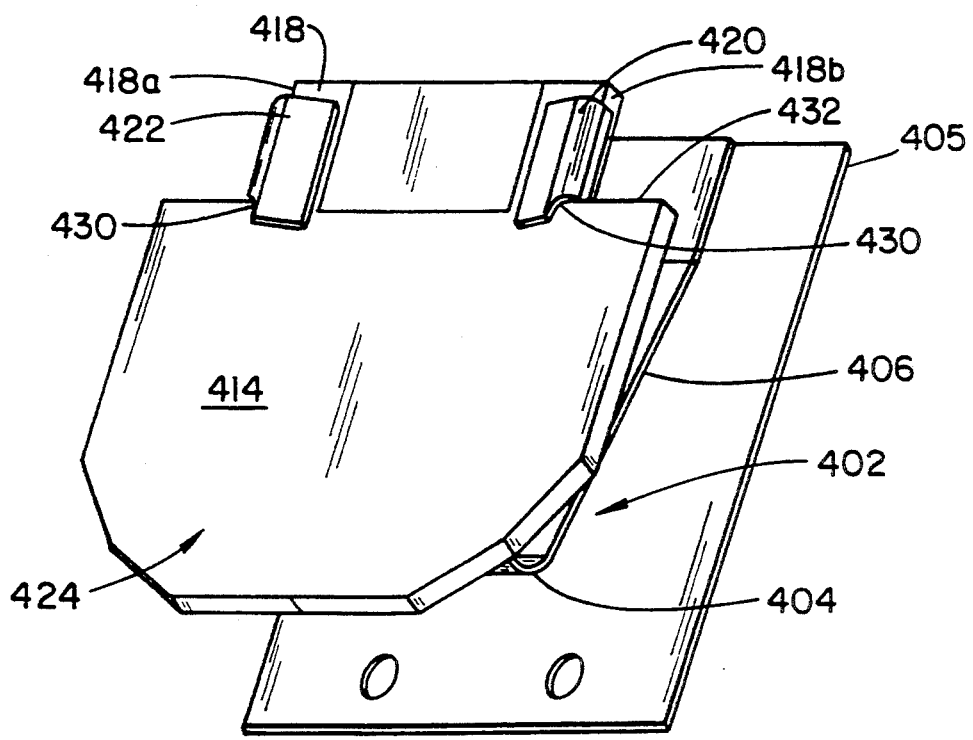
FIG. 7 illustrates, in a perspective view, the holder pursuant to FIG. 6 with the scan mirror mounted thereon.

The upper end of the spring arm 410 with the gripping arms 420, 422 on the holder structure 412, as may be more closely ascertained from FIGS. 6 and 7 of the drawings, discloses that the flexible gripping arms 420 and 422 are each provided at their lower ends with ear lobes 430 or recesses so as to render them more resilient or flexible towards those ends from which the mirror neck portion 418 is inserted into surface contact with the holder structure 412 of the flexure or U-shaped spring 404. Thus, as shown in FIG. 7, upon the mirror being slid beneath the gripping arms 420 and 422 until the upper wider edge of the shoulder 432 contact the lower edges of ear lobes 430 to enable the fixed yet flexible mounting thereof in the holder structure.

Figure 8A:
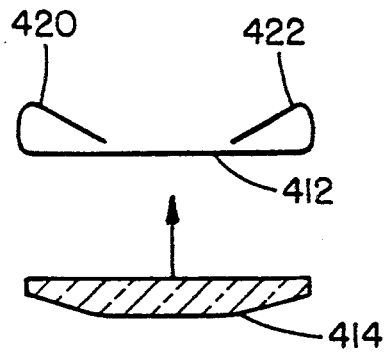
FIGS. 8a through 8c illustrate, in diagrammatic end views, various stages during the introduction of the scan mirror into the inventive holder.
Figure 8B:
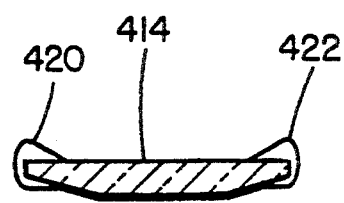
Figure 8C:
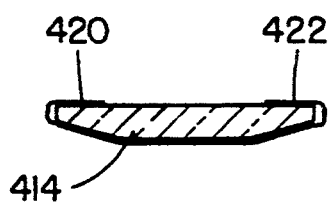
Figure 9A:
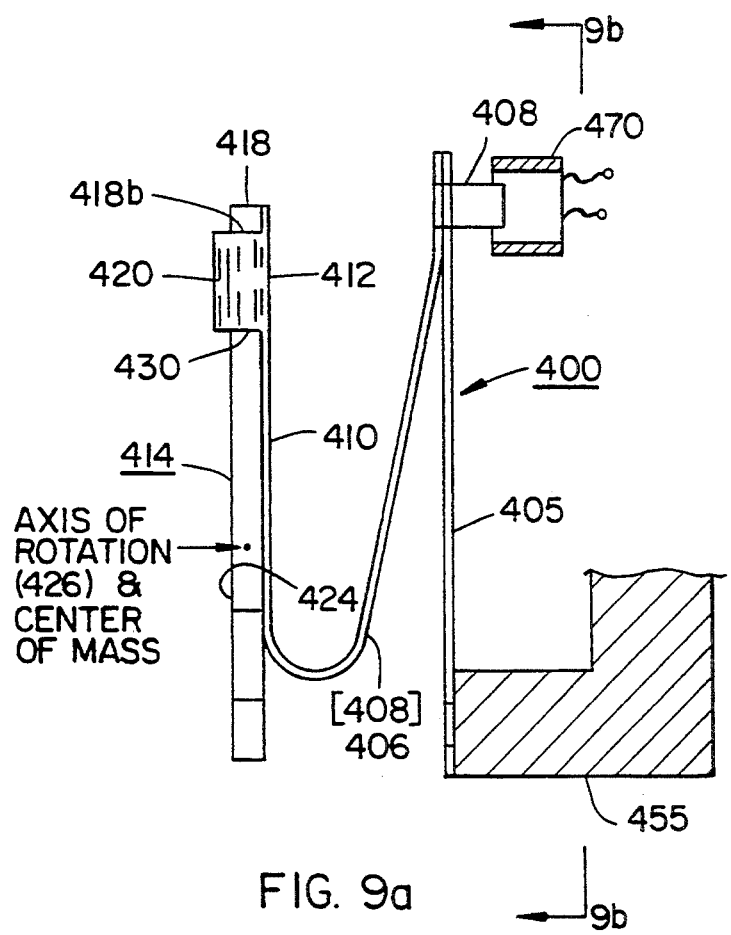
FIGS. 9a and 9b respectively illustrate, generally diagrammatically, the mounting of the mirror or scan element in the holder of FIGS. 6 and 7, with FIG. 9a depicting a side view of the spring holder arrangement for providing a multi-dimensional scan and FIG. 9b depicting a rear sectional view of the FIG. 9a spring holder arrangement.
Figure 9B:
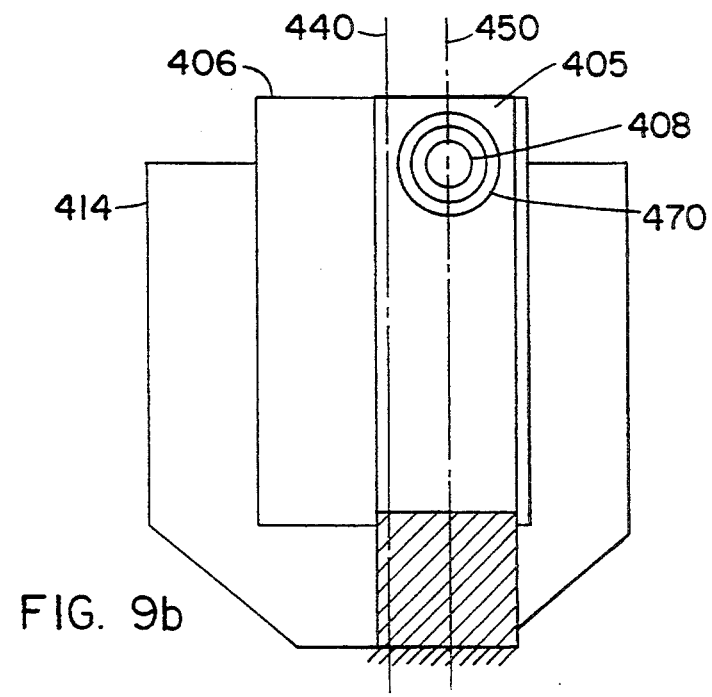
Figure 10:
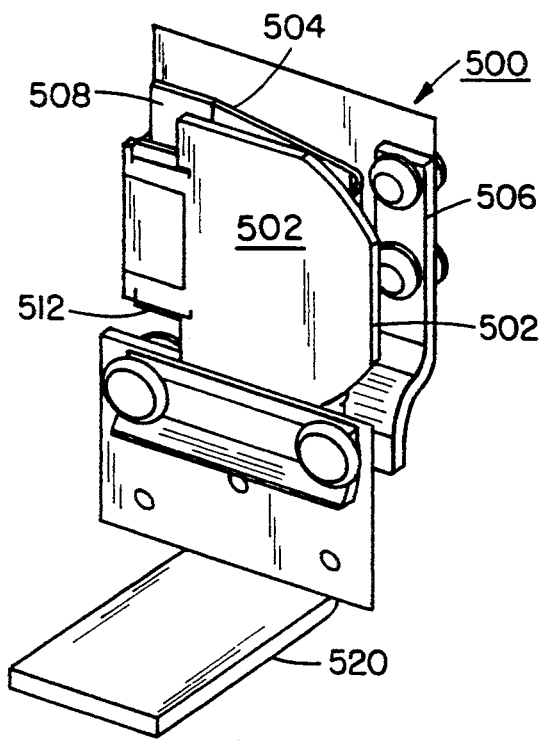
FIG. 10 is a front perspective view of another embodiment of the scanning arrangement.
Figure 11:
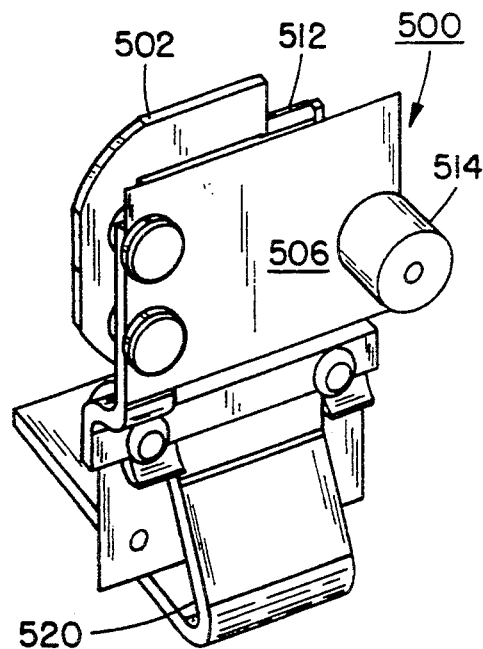
FIG. 11 is a rear perspective view of the scanning arrangement of FIG. 10.
Figure 12:
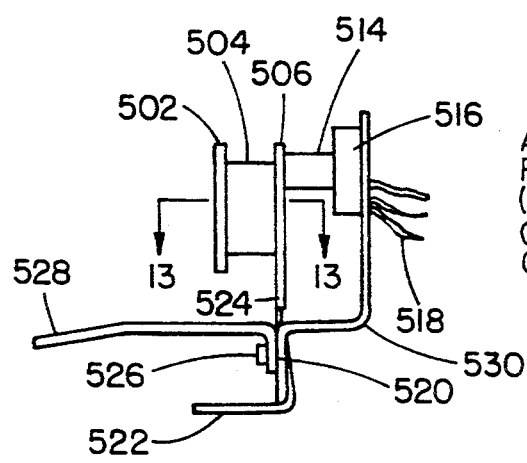
FIG. 12 is a generally deagrammatic side view of the scanning arrangement of FIGS. 10 and 11.
Figure 13:
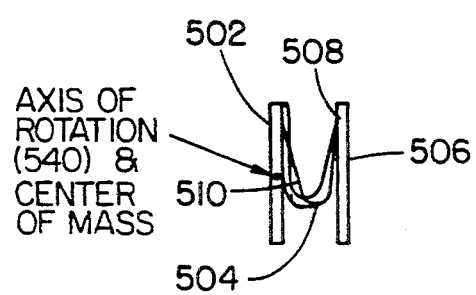
FIG. 13 is a sectional view taken along line 13—13 in FIG. 12.
Figure 14B:
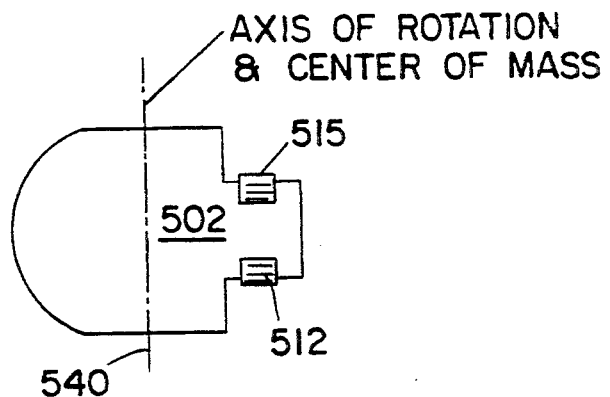
FIGS. 14a and 14b illustrate, in respective plan and front views, a scanning arrangement of the FIG. 10 embodiment.
Figure 14A:
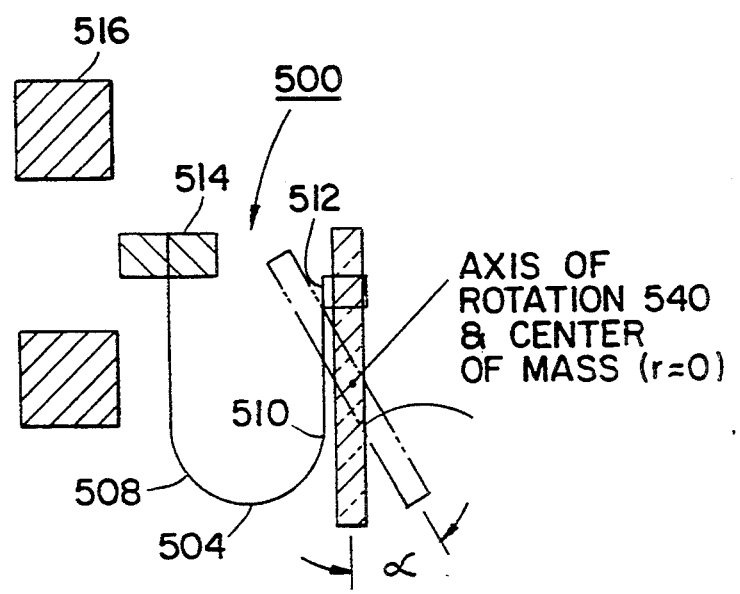

As shown in FIGS. 8a through c, upon the insertion of the edges 418a, 418b of the neck portion 418 of the mirror 404 into the respective clip-like gripping arms 420 and 422 upwardly from the ends containing the ear lobes or recesses 430, the latter of which resultingly render the gripping arms 420, 422 more flexible at the lower ends since this removal of material allows for a greater resilient displacement thereof, the radius of the mirror is utilized to provide an improved attachment, with the lateral mirror dimensions within the holder structure 412 being increased while being advanced into the gripping arms. Consequently, as shown in FIG. 9a of the drawings, with the scanning arrangement 400 supported on base 455 the mounting of the mirror 414 at the upper neck end 418 between the gripping arms 420, 422 and the configuration of the mirror surface enables the coincidence in positioning between the fast axis of rotation 426 for the high-frequency oscillation of the mirror and the center of mass M of the mirror, thereby extensively reducing any generated stresses and imparting an enhanced service life expectancy to the resonant asymmetric scan element. This resultingly maximizes the efficiency in the operation of the scan element and it is possible to attain higher frequencies during scanning operation at larger amplitudes, while employing a larger-sized mirror in comparison with that employed in the earlier constructions. As depicted in FIG. 9b the center of mass of the mirror along vertical axis 440, is offset from the axis 450 along a centerline of the coil 470 and magnet 408. The offset provides a restoring force to torsionally vibrate the planar spring 405 in a first scan direction at low first forcing frequency provided by the coil/magnet assembly. The U-shaped spring vibrates angularly in a second scan direction at higher second forcing frequency which is also provided by the coil/magnet assembly.

The combined effect of the vibration of springs 405 and 406 in one or two directions, and of the rotation of the spring arrangement 400 will be an omni-directional scan. Alternatively, the combined effect of the vibration of springs 405 and 406, each in one of two different directions in response to a high and low frequency driving signal superimposed on the coil, without rotation the spring arrangement 400, will be a raster-like scan over the targeted indicia. Hereby, a high-frequency operation of the inventive scan element within the range of 350 of up to 1200 Hz becomes easily possible for large mirror sizes of up to 0.8 in. by 0.8 in., with a low stress which will inhibit any breaking of the scan element under the oscillating weight of the mirror.

Another preferred embodiment of the invention, as illustrated is FIGS. 10 to 14 of the drawings. In this particular embodiment of the scanning arrangement 500, the scanning element or mirror 502 is essentially of a configuration similar to that of the mirror 414 in FIGS. 5 through 9. However, in this construction of the scanning arrangement 500, a wider flexure is employed for the low-frequency flexure or U-shaped spring 504 mounting the mirror 502 so as to be able to operate at lower frequencies, about the axis of rotation 540 such as within the range of about 5 to 10 Hz. In this instance, a support plate 506 has the free end of arm 508 of the U-shaped spring 504 fastened thereto, with the mirror 502 being fastened to the other arm 510 (FIG. 13) through the intermediary of a holder 512 which is, essentially, similar to holder structure 412 as shown in FIGS. 6 through 9 of the drawings. The end of spring arm 508 and support plate 506 have the permanent magnet 514 fastened thereto so as to extend from the rear surface of plate 506 to be reciprocatably engageable into an electromagnetic coil 516 (FIG. 12) adapted to be supplied with an energizing signal through electrical input leads 518.

As shown in the drawings, in this embodiment the U-shaped spring 504 is rotated or angled by about 90° relative to the extent or axial length of a preferably plate-like or flat high-frequency spring 520 which, if desired, may be constituted from Mylar or the like, which is fastened to a lower bent portion 522 and connection 524 to the plate 506. The portions 522 and 524 of the spring 520 may be beryllium-copper, as also may be the case for U-shaped spring 504. The Mylar material for the high-frequency spring 520 may be fastened by means of suitable screw fasteners 526 so as to be clampingly engaged intermediate its ends between a support frame 528 for the operative components (not shown) of the scanner and a support structure 530 for the electromagnetic coil 516, so as to be modularly installable in a housing of the scanner; such as shown in FIG. 1.

Hereby, the novel configuration of this embodiment of the scanning arrangement not only allows for operation at extremely low scanning frequencies, as mentioned hereinabove, but also provides for an improved isolation from encountered vibrations by the scanning arrangement.

While there have been shown and described what are considered to be preferred embodiments of the invention, it will of course be understood that various modifications and changes in form or detail could readily be made without departing from the spirit of the invention. It is therefore intended that the invention not be limited to the exact form and detail herein shown and described, nor to anything less than the whole of the invention herein disclosed as hereinafter claimed.

What is claimed is:

1. In a scanner for reading indicia having portions of different light reflectivity by directing light from said scanner towards said indicia and by collecting reflected light returning from said indicia; an arrangement for scanning the indicia, comprising:

(a) a scanner component;

(b) holder means mounting said scanner component for angular oscillating movement in first and second scan directions between first and second pairs of scan end positions, said holder means including first and second vibratory means positioned to vibrate in two orthogonal planes and to cooperate for angular oscillating movement in first and second orthogonal scan directions about respective axes for fast and slow oscillatory rotation of said scanner component, said first vibration means comprising a U-shaped spring having a pair of arms, said scanner component being mounted at the first end of one of the arms, said scanner component being configured and said holder means being attached to the scanner component at a position of said component displaced from the center of mass thereof such that the center of mass of said component coincides with the fast axis of oscillatory rotation of said scanner component on said holder means; and (c) read-start means for simultaneously moving said scanner component in said first and second scan directions to simultaneously angularly oscillate said scanner component between said first and second pair of scan end positions for directing the light along said first and second scan directions so as to resultingly implement a two-dimensional scan pattern over the indicia.

2. The arrangement as claimed in claim 1, wherein said read-start means moves said scanner component in scan directions to resultingly implement a raster scan pattern over the indicia.

3. The arrangement as claimed in claim 1, wherein said read-start means moves said scanner component in scan directions to resultingly implement an omnidirectional scan pattern over the indicia.

4. The arrangement as claimed in claim 1, wherein said second vibratory means comprises a generally planar spring having one end secured to the end of the other arm of said U-shaped spring and the other end secured to a base.

5. The arrangement as claimed in claim 4, wherein said read-start means includes an electrically-operated actuator responsive to actuation thereof for vibrating said holder means to angularly oscillate said component in the first and second scan directions, said actuator including an electromagnetic coil having a passage, and a magnet mounted on the holder means and movable into and out of the passage during actuation of said coil.

6. The arrangement as claimed in claim 5, wherein said magnet is mounted on said holder means proximate the juncture between said other end of the planar spring and said other arm of said U-shaped spring.

7. The arrangement as claimed in claim 5, wherein said first vibratory means is configured to vibrate at a high range of frequencies and wherein said second vibratory means is configured to vibrate at a low range of frequencies to thereby effect a raster-type scan pattern over the indicia in response to driving signal applied to said coil comprising a superposition of a first signal having a frequency within said high range and a second signal having a frequency within said low range.

8. The arrangement as claimed in claim 1, wherein the arms of said U-shaped spring are asymmetrically dimensioned.

9. The arrangement as claimed in claim 5, wherein the center of mass of said scanner component is offset from the axis formed by the electromagnetic coil and said magnet.

10. The arrangement as claimed in claim 4, wherein said U-shaped spring is formed from a bent leaf spring.

11. The arrangement as claimed in claim 1, wherein said scanner component scans said indicia at frequencies within the range of about 150 to 1200 Hz.

12. The arrangement as claimed in claim 1, wherein said indicia is a bar code symbol and said scanner is a bar code reader.

13. The arrangement as claimed in claim 1, wherein the holder means on said arm of said vibratory means mounting said scanner component comprises inwardly folded flexible clip means on opposite side edges of said arm, said scanner component having a neck portion of reduced width at one end thereof grippingly engaged between said respective folded clip means so as to be resiliently mounted on said arm.

14. The arrangement as claimed in claim 13, wherein said folded clip means each have earlobes at a low end thereof receiving the neck portion of said scanner component so as to increase the degree of flexibility in the mounting of said component.

15. The arrangement as claimed in claim 14, wherein said scanner component comprises a scan mirror having a convexly-curved rear surface and a neck portion of narrower width having side edges insertable between said folded clip means whereby advancing said mirror into said holder means causes said clip means to enhance gripping engagement therewith through the imparting of a curvature to the surface portion on said arm extending therebetween in conformance with the curvature of said scan mirror.

16. The arrangement as claimed in claim 13, wherein at least said folded clip means and scanner component mounting means are constituted from a non-ferrous alloy.

17. The arrangement as claimed in claim 16, wherein said non-ferrous alloy comprises a beryllium-copper alloy.

18. A method for reading indicia having portions of differing light reflectivity by directing light from a scanner towards said indicia and by collecting reflected light returning from said indicia through the intermediary of a scanning arrangement for scanning the indicia, comprising:
   imparting angular oscillating movement to a scanner component of said scanning arrangement in first and second scan directions between first and second pairs of scan end positions;
   vibrating first and second vibratory means in two orthogonal planes so as to cooperate for angular oscillating movement in first and second orthogonal scan directions about respectively axes for fast and slow oscillatory rotation of said scanner component, said scanner component having a center of mass;
   positioning said center of mass to coincide with the fast axis of oscillatory rotation of said scanner component on said holder means;
   said first vibrating means being configured as a U-shaped spring having a pair of arms, and with the free end of one of the arms being attached to said scanner component at a position thereon displaced from said center of mass; and simultaneously moving said component responsive to actuation by read-start means in said first and second scan directions to simultaneously angularly oscillate said scanner component between said first and second pair of scan end positions for directing the light along said first and second scan directions so as to resultingly implement a two-dimensional scan pattern over the indicia.

19. The method as claimed in claim 18, wherein said scanner implements a raster scan pattern over said indicia.

20. The method as claimed in claim 18, wherein said scanner component implements an omnidirectional scan pattern over said indicia.

21. The method as claimed in claim 18, wherein said second vibratory means is configured as a generally planar spring having one end secured to the end of the other arm of said U-shaped spring and the other end secured to a base.

22. The method as claimed in claim 21, wherein said read-start means includes an electrically-operated actuator responsive to actuation thereof for vibrating said holder means to angularly oscillate said component in the first and second scan directions, said actuator including an electromagnetic coil having a passage; and mounting a magnet mounted on the vibratory means so as to be movable into and out of the passage during actuation of said coil.

23. The method as claimed in claim 22, comprising mounting said magnet on said vibratory means proximate the juncture between said other end of the planar spring and said other arm of said U-shaped spring.

24. The method as claimed in claim 22, comprising vibrating said first vibratory means at a high range of frequencies and vibrating said second vibratory means at a low range of frequencies to thereby effect a raster-type scan pattern over the indicia in response to applying a driving signal to said coil comprising superimposing a first signal having a frequency within said high range and a second signal having a frequency within said low range.

25. The method as claimed in claim 18, wherein the arms of said U-shaped spring are asymmetrically dimensioned.

26. The method as claimed in claim 22, wherein the center of mass of said scanner component is offset from the axis formed by the electromagnetic coil and said magnet.

27. The method as claimed in claim 18, wherein said indicia is scanned at frequencies within the range of about 150 to 1200 Hz.

28. The method as claimed in claim 18, wherein said indicia is a bar code symbol and said scanning arrangement is a bar code reader.

29. The method as claimed in claim 18, wherein said free end of the arm of said vibratory means mounting said scanner component includes means having inwardly folded flexible clip means at the opposite edges of said arm, said scanner component having a neck portion of reduced width, opposite side edges of said neck portion being grippingly engaged between said respective folded clip means for resiliently mounting said scanner component on said arm.

30. The method as claimed in claim 29, wherein said folded clip means each have earlobes at a lower end receiving said scanner component so as to increase the degree of flexibility of said clip means towards said lower ends.

31. The method as claimed in claim 30, wherein said scanner component comprises a scan mirror having a convexly-curved rear surface and a reduced width neck portion having side edges insertable into said folded clip means from the ends having said earlobes whereby advancing said mirror into said clip means causes the latter to enhance the gripping engagement with said mirror through the imparting of a curvature to the surface portion on said arm extending therebetween in conformance with the curvature of said scan mirror.

32. The method as claimed in claim 29, wherein at least said folded clip means and mounting means for said scanner component are constituted from a non-ferrous alloy.

33. The method as claimed in claim 32, wherein said non-ferrous alloy comprises a beryllium-copper alloy.

34. In a scanner for reading indicia having portions of different light reflectivity by directing light from said scanner towards said indicia and by collecting reflected light returning from said indicia; an arrangement for scanning the indicia, comprising:
   (a) a scanner component;
   (b) holder means mounting said scanner component for angular oscillating movement in first and second scan directions between first and second pairs of scan end positions, said holder means including first and second vibratory means positioned to vibrate in two orthogonal planes and to cooperate for angular oscillating movement in first and second orthogonal scan directions about respective axes for fast and slow oscillatory rotation of said scanner component, said scanner component being configured and being mounted on said holder means such that the center of mass of said component coincides with the fast axis of oscillatory rotation of said scanner component on said holder means; and (c) read-start means for simultaneously moving said scanner component in said first and second scan directions to simultaneously angularly oscillate said scanner component between said first and second pair of scan end positions for directing the light along said first and second scan directions so as to resultingly implement a two-dimensional scan pattern over the indicia;

wherein
(i) said first vibratory means comprises a U-shaped spring having a pair of arms, said scanner component being mounted at the free end of one of said arms,
(ii) said second vibratory means comprises a generally planar spring having one end secured to the end of the other arm of said U-shaped spring and the other end secured to a base,
(iii) said read-start means includes an electrically-operated actuator responsive to actuation thereof for vibrating said holder means to angularly oscillate said component in the first and second scan directions, said actuator including an electromagnetic coil having a passage, and a magnet mounted on the holder means and movable into and out of the passage during actuation of said coil, and
(iv) said first vibratory means is configured to vibrate at a high range of frequencies and wherein said second vibratory means is configured to vibrate at a low range of frequencies to thereby effect a raster-type scan pattern over the indicia in response to driving signal applied to said coil comprising a superposition of a first signal having a frequency within said high range and a second signal having a frequency within said low range.

35. In a scanner for reading indicia having portions of different light reflectivity by directing light from said scanner towards said indicia and by collecting reflected light returning from said indicia; an arrangement for scanning the indicia, comprising:
(a) a scanner component;
(b) holder means mounting said scanner component for angular oscillating movement in first and second scan directions between first and second pairs of scan end positions, said holder means including first and second vibratory means positioned to vibrate in two orthogonal planes and to cooperate for angular oscillating movement in first and second orthogonal scan directions about respective axes for fast and slow oscillatory rotation of said scanner component, said scanner component being configured and being mounted on said holder means such that the center of mass of said component coincides with the fast axis of oscillatory rotation of said scanner component on said holder means; and (c) read-start means for simultaneously moving said scanner component in said first and second scan directions to simultaneously angularly oscillate said scanner component between said first and second pair of scan end positions for directing the light along said first and second scan directions so as to resultingly implement a two-dimensional scan pattern over the indicia;

wherein
(i) said first vibratory means comprises a U-shaped spring having a pair of arms, said scanner component being mounted at the free end of one of said arms,
(ii) said second vibratory means comprises a generally planar spring having one end secured to the end of the other arm of said U-shaped spring and the other end secured to a base,
(iii) said read-start means includes an electrically-operated actuator responsive to actuation thereof for vibrating said holder means to angularly oscillate said component in the first and second scan directions, said actuator including an electromagnetic coil having a passage, and a magnet mounted on the holder means and movable into and out of the passage during actuation of said coil, and
(iv) the center of mass of said scanner component is offset from the axis formed by the electromagnetic coil and said magnet.

36. In a scanner for reading indicia having portions of different light reflectivity by directing light from said scanner towards said indicia and by collecting reflected light returning from said indicia; an arrangement for scanning the indicia, comprising:
(a) a scanner component;
(b) holder means mounting said scanner component for angular oscillating movement in first and second scan directions between first and second pairs of scan end positions, said holder means including folded clip means for holding said scanner component and first and second vibratory means positioned to vibrate in two orthogonal planes and to cooperate for angular oscillating movement in first and second orthogonal scan directions about respective axes for fast and slow oscillatory rotation of said scanner component, said scanner component being configured and being mounted on said holder means such that the center of mass of said component coincides with the fast axis of oscillatory rotation of said scanner component on said holder means; and (c) read-start means for simultaneously moving said scanner component in said first and second scan directions to simultaneously angularly oscillate said scanner component between said first and second pair of scan end positions for directing the light along said first and second scan directions so as to resultingly implement a two-dimensional scan pattern over the indicia; ps wherein
(i) said first vibratory means comprises a U-shaped spring having a pair of arms, said scanner component being mounted at the free end of one of said arms, and
(ii) said second vibratory means comprises a generally planar spring having one end secured to the end of the other arm of said U-shaped spring and the other end secured to a base.

37. The arrangement as claimed in claim 36, wherein said folded clip means each have earlobes at a low end thereof receiving the neck portion of said scanner component so as to increase the degree of flexibility in the mounting of said component.

38. The arrangement as claimed in claim 37 wherein said scanner component comprises a scan mirror having a convexly-curved rear surface and a neck portion of narrower width having side edges insertable between said folded slip means whereby advancing said mirror into said holder means causes said clip means to enhance gripping engagement theSewith through the imparting of a curvature to the surface portion on said arm extending therebetween in conformance with the curvature of said scan mirror.

39. The arrangement as claimed in claim 36, wherein at least said folded clip means and scanner component mounting means are constituted from a non-ferrous alloy.

40. The arrangement as claimed in claim 39, wherein said nonferrous alloy comprises a beryllium-copper alloy.

41. A method for reading indicia having portions of differing light reflectivity by directing light from a scanner towards said indicia and by collecting reflected light returning from said indicia through the intermediary of a scanning arrangement for scanning the indicia, comprising:

imparting angular oscillating movement to a scanner component of said scanning arrangement in first and second scan directions between first and second pairs of scan end positions;

vibrating first and second vibratory means in two orthogonal planes so as to cooperate for angular oscillating movement in first and second orthogonal scan directions about respectively axes for fast and slow oscillatory rotation of said scanner component, said scanner component having a center of mass;

positioning said center of mass to coincide with the fast axis of oscillatory rotation of said scanner component on said holder means; and simultaneously moving said component responsive to actuation by read-start means in said first and second scan directions to simultaneously angularly oscillate said scanner component between said first and second pair of scan end positions for directing the light along said first and second scan directions so as to resultingly implement a two-dimensional scan pattern over the indicia, wherein said scanner component implements an omnidirectional scan pattern over said indicia.

42. A method for reading indicia having portions of differing light reflectivity by directing light from a scanner towards said indicia and by collecting relfected light returning from said indicia through the intermediary of a scanning arrangement for scanning the indicia, comprising:

imparting angular oscillating movement to a scanner component of said scanning arrangement in first and second scan directions between first and second pairs of scan end positions;

vibrating first and second vibratory means in two orthogonal planes so as to cooperate for angular oscillating movement in first and second orthogonal scan directions about respectively axes for fast and slow oscillatory rotation of said scanner component, said scanner component having a center of mass coinciding with the fast axis of oscillatory rotation of said scanner component on said holder means;

simultaneously moving said component responsive to actuation by a read-start means in said first and second scan directions to simultaneously angularly oscillate said scanner component between said first and second pair of scan end positions for directing the light along said first and second scan directions so as to resultingly implement a two-dimensional scan pattern over the indicia, wherein (i) said first vibratory means is configured as a U-shaped spring having a pair of arms, comprising mounting said scanner component at the free end of one of said arms;

(ii) said second vibratory means is configured as a generally planar spring having one end secured to the end of the other arm of said U-shaped spring and the other end secured to a base; and (iii) said read-start means includes an electrically-operated actuator responsive to actuation thereof for vibrating said holder means to angularly oscillate said component in the first and second scan directions, said actuator including an electromagnetic coil having a passage, and mounting a magnet mounted on the vibratory means so as to be movable into and out of the passage during actuation of said coil; and vibrating said first vibratory means at a high range of frequencies and vibrating said second vibratory means at a low range of frequencies to thereby effect a raster-type scan pattern over the indicia in response to applying a driving signal to said coil comprising superimposing a first signal having a frequency within said high range and a second signal having a frequency within said low range.

43. A method for reading indicia having portions of differing light reflectivity by directing light from a scanner towards said indicia and by collecting reflected light returning from said indicia through the intermediary of a scanning arrangement for scanning the indicia, comprising:

imparting angular oscillating movement to a scanner component of said scanning arrangement in first and second scan directions between first and second pairs of scan end positions;

vibrating first and second vibratory means in two orthogonal planes so as to cooperate for angular oscillating movement in first and second orthogonal scan directions about respectively axes for fast and slow oscillatory rotation of said scanner component, said scanner component having a center of mass;

positioning said center of mass to coincide with the fast axis of oscillatory rotation of said scanner component on said holder means; and simultaneously moving said component responsive to actuation by read-start means in said first and second scan directions to simultaneously angularly oscillate said scanner component between said first and second pair of scan end positions for directing the light along said first and second scan directions so as to resultingly implement a two-dimensional scan pattern over the indicia, wherein (i) said first vibratory means is configured as a U-shaped spring having a pair of arms, comprising mounting said scanner component at the free end of one of said arms; and (ii) said free end of the arm of said vibratory means mounting said scanner component includes means having inwardly folded flexible clip means at the opposite edges of said arm, said scanner component having a neck portion of reduced width, opposite side edges of said neck portion being grippingly engaged between said respective folded clip means for resiliently mounting said scanner component on said arm.

44. The method as claimed in claim 43, wherein said folded clip means each have earlobes at a lower end receiving said scanner component so as to increase the degree of flexibility of said clip means towards said lower ends.

45. The method as claimed in claim 44, wherein said scanner component comprises a scan mirror having a convexly-curved rear surface and a reduced width neck portion having side edges insertable into said folded clip means from the ends having said earlobes whereby advancing said mirror into said clip means causes the latter to enhance the gripping engagement with said mirror through the imparting of a curvature to the surface portion on said arm extending therebetween in conformance with the curvature of said scan mirror.

46. The method as claimed in claim 43, wherein at least said folded clip means and mounting means for said scanner component are constituted from a non-ferrous alloy.

47. The method as claimed in claim 46, wherein said nonferrous alloy comprises a beryllium-copper alloy.

48. In a scanner for reading indicia having portions of different light reflectivity by directing light from said scanner towards said indicia and by collecting reflected light returning from said indicia; an arrangement for scanning the indicia, comprising:

(a) a scanner component;
(b) holder means mounting said scanner component for angular oscillating movement in first and second scan directions between first and second pairs of scan end positions, said holder means including first and second vibratory means positioned to vibrate in two orthogonal planes and to cooperate for angular oscillating movement in first and second orthogonal scan directions about respective axes for fast and slow oscillatory rotation of said scanner component, said scanner component being configured and being mounted on said holder means such that the center of mass of said component coincides with the fast axis of oscillatory rotation of said scanner component on said holder means; and
(c) read-start means for simultaneously moving said scanner component in said first and second scan directions to simultaneously angularly oscillate said scanner component between said first and second pair of scan end positions for directing the light along said first and second scan directions so as to resultingly implement a two-dimensional scan pattern over the indicia;
(d) rotating means for rotating said holder means in a third plane;
(e) wherein said rotating means together with said read-start means move said scanner component in scan directions to resultingly implement an omnidirectional scan pattern over the indicia.

49. A method for reading indicia having portions of differing light reflectivity by directing light from said scanner towards said indicia and by collecting reflected light returning from said indicia through the intermediary of an arrangement for scanning the indicia, comprising:

imparting angular oscillating movement to a scanner component of said scanning arrangement in first and second scan directions between first and second pairs of scan end positions;

vibrating first and second vibratory means in two orthogonal planes so as to cooperate for angular oscillating movement in first and second orthogonal scan directions about respectively axes for fast and slow oscillatory rotation of said scanner component, said scanner component having a center of mass coinciding with the fast axis of oscillatory rotation of said scanner component on said holder means; and simultaneously moving said component responsive to actuation by read-start means in said first and second scan directions to simultaneously angularly oscillate said scanner component between said first and second pair of scan end positions for directing the light along said first and second scan directions so as to resultingly implement a two-dimensional scan pattern over the indicia, wherein
(i) said first vibratory means is configured as a U-shaped spring having a pair of arms, comprising mounting said scanner component at the free end of one of said arms;
(ii) said second vibratory means is configured as a generally planar spring having one end secured to the end of the other arm of said U-shaped spring and the other end secured to a base;
(iii) said read-start means includes an electrically-operated actuator responsive to actuation thereof for vibrating said holder means to angularly oscillate said component in the first and second scan directions, said actuator including an electromagnetic coil having a passage, and mounting a magnet mounted on the vibratory means so as to be movable into and out of the passage during actuation of said coil; and
(iv) the center of mass of said scanner component is offset from the axis formed by the electromagnetic coil and said magnet.

50. In a scanner for reading indicia having portions of different light reflectivity by directing light from said scanner towards said indicia and by collecting reflected light returning from said indicia; an arrangement for scanning the indicia, comprising:

(a) a scanner component;
(b) holder means mounting said scanner component for angular oscillating movement in first and second scan directions between first and second pairs of scan end positions, said holder means including first and second vibratory means positioned to vibrate in two orthogonal planes and to cooperate for angular oscillating movement in first and second orthogonal scan directions about respective axes for slow and fast oscillatory rotation of said scanner component, said first vibration means comprising a U-shaped spring having a pair of arms, said scanner component being mounted at the first end of one of the arms, said scanner component being configured and said holder means being attached to the scanner component at a position of said component displaced from the center of mass thereof such that the center of mass of said component coincides with the slow axis of oscillatory rotation of said scanner component on said holder means; and (c) read-start means for simultaneously moving said scanner component in said first and second scan directions to simultaneously angularly oscillate said scanner component between said first and second pair of scan end positions for directing the light along said first and second scan directions so as to resultingly implement a two-dimensional scan pattern over the indicia.

51. The arrangement as claimed in claim 50, wherein said second vibratory means comprises a generally planar spring having one end secured to the end of the other arm of said U-shaped spring and the other end secured to a base.

52. The arrangement as claimed in claim 51 wherein said read-start means includes an electrically-operated actuator responsive to actuation thereof for vibrating said holder means to angularly oscillate said component in the first and second scan direction, said actuator. including an electromagnetic coil having a passage, and a magnet mounted on the holder means and movable into and out of the passage during actuation of said coil.

53. The arrangement as claimed in claim 52, wherein the center of mass of said scanner component is offset from the axis formed by the electromagnetic coil and said magnet.

54. The arrangement as claimed in claim 53, wherein the offset center of mass of said scanner component provides a restoring force to torsionally vibrate said planar spring along the second scan direction at a high range of frequencies, and said Ushaped spring vibrates along the first scan direction at a low range of frequencies to effect a raster-type scan over the indicia in response to a superimposed high and low frequency driving signal.

55. A method for reading indicia having portions of differing light reflectivity by directing light from a scanner towards said indicia and by collecting reflected light returning from said indicia through the intermediary of a scanning arrangement for scanning the indicia, comprising:

imparting angular oscillating movement to a scanner component of said scanning arrangement in first and second scan directions between first and second pairs of scan end positions;

vibrating first and second vibratory means in two orthogonal planes so as to cooperate for angular oscillating movement in first and second orthogonal scan directions about respectively axes for slow and fast oscillatory rotation of said scanner component, said scanner component having a center of mass;

positioning said center of mass to coincide with the slow axis of oscillatory rotation of said scanner component on said holder means;

configuring said first vibrating means as a U-shaped spring having a pair of arms, with the free end of one of the arms being attached to said scanner component at a position thereon displaced from said center of mass; and simultaneously moving said component responsive to actuation by read-start means in said first and second scan directions to simultaneously angularly oscillate said scanner component between said first and second pair of scan end positions for directing the light along said first and second scan directions so as to resultingly implement a two-dimensional scan pattern over the indicia.

56. The method as claimed in claim 55, further comprising the step of configuring said second vibratory means as a generally planar spring having one end secured to the end of the other arm of said U-shaped spring and the other end secured to a base.

57. The method as claimed in claim 56, wherein said readstart means includes an electrically-operated actuator responsive to actuation thereof for vibrating said holder means to angularly oscillate said component in the first and second scan directions, said actuator including an electromagnetic coil having a passage; and further comprising the step of mounting a magnet on the vibratory means so as to be movable into and out of the passage during actuation of said coil.

58. The method as claimed in claim 57, wherein the center of mass of said scanner component is offset from the axis formed by the electromagnetic coil and said magnet.

59. The method as claimed in claim 58, wherein the offset center of mass of said scanner component provides a restoring force to torsionally vibrate said planar spring along the second scan direction at a high range of frequencies, and said U-shaped spring vibrates along the first scan direction at a low range of frequencies to effect a raster-type scan over the indicia in response to a superimposed high and low frequency driving signal.

60. In a scanner for reading indicia having portions of different light reflectivity by directing light from said scanner towards said indicia and by collecting reflected light returning from said indicia; an arrangement for scanning the indicia, comprising:

(a) a scanner component;

(b) holder means mounting said scanner component for angular oscillating movement in first and second scan directions between first and second pairs of scan end positions, said holder means including first and second vibratory means positioned to vibrate in two orthogonal planes and to cooperate for angular oscillating movement in first and second orthogonal scan directions about respective axes for slow and fast oscillatory rotation of said scanner component, said scanner component being configured and being mounted on said holder means such that the center of mass of said component coincides with the slow axis of oscillatory rotation of said scanner component on said holder means; and (c) read-start means for simultaneously moving said scanner component in said first and second scan directions to simultaneously angularly oscillate said scanner component between said first and second pair of scan end positions for directing the light along said first and second scan directions so as to resultingly implement a two-dimensional scan pattern over the indicia;

wherein (i) said first vibratory means comprises a U-shaped spring having a pair of arms, said scanner component being mounted at the free end of one of said arms, (ii) said second vibratory means comprises a generally planar spring having one end secured to the end of the other arm of said U-shaped spring and the other end secured to a base, (iii) said read-start means includes an electrically-operated actuator responsive to actuation thereof for vibrating said holder means to angularly oscillate said component in the first and second scan directions, said actuator including an electromagnetic coil having a passage, and a magnet mounted on the holder means and movable into and out of the passage during actuation of said coil, and (iv) the center of mass of said scanner component is offset from the axis formed by the electromagnetic coil and said magnet.

61. The arrangement as claimed in claim 60, wherein the offset center of mass of said scanner component provides a restoring force to torsionally vibrate said planar spring along the second scan direction at a high range of frequencies, and said U-shaped spring vibrates along the first scan direction at a low range of frequencies to effect a raster-type scan over the indicia in response to a superimposed high and low frequency driving signal.

62. A method for reading indicia having portions of differing light reflectivity by directing light from said scanner towards said indicia and by collecting reflected light returning from said indicia through the intermediary of an arrangement for scanning the indicia, comprising:

imparting angular oscillating movement to a scanner component of said scanning arrangement in first and second scan directions between first and second pairs of scan end positions;

vibrating first and second vibratory means in two orthogonal planes so as to cooperate for angular oscillating movement in first and second orthogonal scan directions about respectively axes for slow and fast oscillatory rotation of said scanner component, said scanner component having a center of mass;

positioning said center of mass to coincide with the slow axis of oscillatory rotation of said scanner component on said holder means; and simultaneously moving said component responsive to actuation by read-start means in said first and second scan directions to simultaneously angularly oscillate said scanner component between said first and second pair of scan end positions for directing the light along said first and second scan directions so as to resultingly implement a two-dimensional scan pattern over the indicia, wherein (i) said first vibratory means is configured as a U-shaped spring having a pair of arms, comprising mounting said scanner component at the free end of one of said arms;

(ii) said second vibratory means is configured as a generally planar spring having one end secured to the end of the other arm of said U-shaped spring and the other end secured to a base;

(iii) said read-start means includes an electrically-operated actuator responsive to actuation thereof for vibrating said holder means to angularly oscillate said component in the first and second scan directions, said actuator including an electromagnetic coil having a passage, and mounting a magnet mounted on the vibratory means so as to be movable into and out of the passage during actuation of said coil; and (iv) the center of mass of said scanner component is offset from the axis formed by the electromagnetic coil and said magnet.

63. The method as claimed in claim 62, wherein the offset center of mass of said scanner component provides a restoring force to torsionally vibrate said planar spring along the second scan direction at a high range of frequencies, and said U-shaped spring vibrates along the first scan direction at a low range of frequencies to effect a raster-type scan over the indicia in response to a superimposed high and low frequency driving signal.

* * * * *